US012583228B2

(12) United States Patent
Vegelahn et al.

(10) Patent No.: US 12,583,228 B2
(45) Date of Patent: Mar. 24, 2026

(54) STORAGE SYSTEM AND PRINTING SYSTEM

(71) Applicant: EKRA AUTOMATISIERUNGSSYSTEME GMBH, Bönnigheim (DE)

(72) Inventors: Torsten Vegelahn, Sternenfels (DE); Michael Hammann, Oberderdingen (DE); Tobias Apel, Olfen (DE)

(73) Assignee: EKRA AUTOMATISIERUNGSSYSTEME GMBH, Bönnigheim (DE)

( * ) Notice: Subject to any disclaimer, the term of this patent is extended or adjusted under 35 U.S.C. 154(b) by 124 days.

(21) Appl. No.: 18/252,628

(22) PCT Filed: Nov. 29, 2021

(86) PCT No.: PCT/EP2021/083354

§ 371 (c)(1),
(2) Date: May 11, 2023

(87) PCT Pub. No.: WO2022/112554

PCT Pub. Date: Jun. 2, 2022

(65) Prior Publication Data

US 2024/0001683 A1 Jan. 4, 2024

(30) Foreign Application Priority Data

Nov. 30, 2020 (DE) ..................... 10 2020 215 072.9

(51) Int. Cl.
*B41J 2/175* (2006.01)

(52) U.S. Cl.
CPC ......... *B41J 2/1752* (2013.01); *B41J 2/17546* (2013.01); *B41J 2/17566* (2013.01)

(58) Field of Classification Search
CPC ... B41J 2/1752; B41J 2/17546; B41J 2/17566
See application file for complete search history.

(56) References Cited

U.S. PATENT DOCUMENTS 6,142,617 A * 11/2000 Barinaga .............. B41J 2/17506 347/85
6,769,357 B1 * 8/2004 Finan ..................... B41J 3/4073 101/483

(Continued)

FOREIGN PATENT DOCUMENTS

CN 108906820 A 11/2018
DE 197 21 235 A1 12/1998

(Continued)

OTHER PUBLICATIONS

Chinese Office Action dated Mar. 28, 2025 for corresponding Chinese Application No. 202180077811.X and English translation.

(Continued)

*Primary Examiner* — Anh T Vo

(74) *Attorney, Agent, or Firm* — Chrisman Gallo Tochtrop LLC

(57) ABSTRACT

The application relates to a storage system for storing and providing printing compound for a printing device, more particularly for printing on planar substrates, including: —at least one container designed to store a liquid printing compound; and —at least one carrier, on which the container can be detachably disposed. According to the application, the storage system includes a storage magazine having a plurality of carriers and having a plurality of containers, and the carriers are fastened to a circulating conveyor belt, the conveyor belt being assigned at least one controllable drive motor for driving the conveyor belt.

15 Claims, 4 Drawing Sheets

(56) References Cited

U.S. PATENT DOCUMENTS

| | | | | |
|---|---|---|---|---|
| 9,302,484 | B2 | 4/2016 | Suzuki et al. | |
| 2004/0089174 | A1 | 5/2004 | Ghisalberti et al. | |
| 2012/0017783 | A1* | 1/2012 | Uptergrove | B41F 17/30 101/38.1 |
| 2012/0097005 | A1 | 4/2012 | Braun | |
| 2012/0097055 | A1* | 4/2012 | Beck | B41J 3/4073 101/35 |
| 2017/0269543 | A1* | 9/2017 | Itabashi | G03G 21/1661 |
| 2022/0219465 | A1* | 7/2022 | Seitel | B41J 3/40731 |

FOREIGN PATENT DOCUMENTS

| | | | | |
|---|---|---|---|---|
| GB | 2 325 437 | A | 11/1998 | |
| JP | 2002036527 | * | 2/2002 | B41J 2/175 |
| KR | 10-2032794 | B1 | 10/2019 | |
| WO | 2017/006382 | A1 | 1/2017 | |
| WO | 2020/035135 | A1 | 2/2020 | |

OTHER PUBLICATIONS

International Search Report for corresponding International Application No. PCT/EP2021/083354 mailed Mar. 17, 2022.
Written Opinion for corresponding International Application No. PCT/EP2021/083354 dated Mar. 17, 2022.
International Preliminary Report on Patentability for corresponding International Application No. PCT/EP2021/083354 dated Nov. 10, 2022.

* cited by examiner

STORAGE SYSTEM AND PRINTING SYSTEM

FIELD OF THE INVENTION

The invention relates to a storage system for storing and providing printing compound for a printing device, in particular for printing on planar substrates, comprising at least one container, which is formed for storing a liquid printing compound, and comprising at least one carrier, on which the container can be detachably arranged.

The invention furthermore relates to a printing system for printing on planar substrates, in particular circuit boards, solar cells, or wafers, comprising at least one print head, in particular dispenser, for applying printing compound to the substrates, wherein the print head can be connected or is connected to a container providing a printing compound, and comprising a storage system, which has at least one container, which is formed for storing a liquid printing compound, and at least one carrier, on which the container can be detachably arranged.

BACKGROUND OF THE INVENTION

Storage means and printing systems of the above-mentioned type are already known from the prior art. The printing on planar substrates with different printing compounds, such as, for example, color or electroconductive paste, is already known, for example, from the circuit board technology or solar technology. Due to the fact that the same printing compound is not always used in known printing devices, it is necessary to store the different printing compounds in containers, which are suitable for this purpose, and, if required, to connect the respective container to the print head or the printing means, respectively, so that the printing compound can be extracted from the container and can be applied to the substrate. It is one option to permanently connect the print head to several containers, in order to be able to promptly access different printing compounds. This, however, requires an installation space-intensive print head comprising a complex cabling and wiring. Solutions with exchangeable containers are thus preferred. So that the container can be stored safely outside the printing means or the print head, storage means are known, which have a carrier matching the container, so that the container can be arranged safely on the carrier and can be extracted out of or from the container, if required.

BRIEF SUMMARY OF THE INVENTION

The invention is based on the object of creating an improved storage means, which, on the one hand, provides for the storage of different printing compounds and which, on the other hand, ensures a simple removal of the printing compounds.

The object, on which the invention is based, is solved by means of a storage means comprising the features of claim 1. It is characterized in that it is formed as storage magazine, which has several carriers, wherein the carriers are fastened to a circulating conveyor belt, wherein at least one controllable drive motor for driving the conveyor belt is assigned to the conveyor belt. The storage magazine is in particular a ring magazine, in the case of which the carriers are fastened to the conveyor belt and can be moved by means of the conveyor belt along a closed ring shape. The carriers and the containers optionally located on the respective carrier can thus be transported along the movement path of the conveyor belt and can thus preferably be displaced from a protected stowage position into an extraction position. With the formation as storage magazine, several containers can be stored on the conveyor belt and can be selected, if required. Due to the drive motor, which is preferably formed as electric motor, pneumatic motor, or hydraulic motor, a systematic displacement of the containers or of the carriers, respectively, is ensured with only small installation space demands. The conveyor belt is preferably formed as conveyor cable or as conveyor strap, particularly preferably as toothed belt.

According to a preferred embodiment of the invention, the conveyor belt comprising the carriers is arranged in a housing, and the housing has at least one opening, through which the respective container can be fastened to one of the carriers or can be removed from one of the carriers. The opening is thus formed on a transfer point of the housing, on which containers can be extracted from the magazine or be inserted into the magazine. Apart from that, the housing is preferably formed to be at least substantially closed, so that the containers are protected against external influences within the housing. With the housing, it is also attained, for example, that the internal space of the housing can be temperature-controlled or can be provided with a climate, which ensures a long storage period of the printing compounds in the housing or in the storage magazine, respectively. For this purpose, a controllable air-conditioning means is preferably assigned to the housing. A closing element, by means of which the opening can be closed completely, in order to be able to maintain the climate within the housing in an energy-efficient manner, is optionally assigned to the opening of the housing. In particular an actuator, by means of which the closing element can be opened or closed in an automated manner, is assigned to the closing element. Instead of a displaceable, in particular pivotable or shiftable closing element, a curtain, in particular lamellar curtains, is also conceivable in the region of the opening, in order to close the latter at least for the most part, and to thus protect the internal space against the climate in the surrounding area of the housing. The opening is preferably formed in its side wall and/or ceiling wall of the housing.

According to a preferred embodiment of the invention, all of the carriers of the storage magazine are formed identically. All of the carriers thus serve the purpose of receiving identically formed containers. The system can thus be used easily and different printing compounds can be filled into the containers. A simple exchange as well as an optimized utilization of the installation space are thus securely ensured.

The conveyor belt is in particular formed so as to circulate in a horizontal plane, so that by driving the conveyor belt, the containers are likewise displaced or shifted, respectively, in the horizontal plane. The containers are thus always located next to one another in the storage magazine, and a collision of adjacent containers is securely prevented. According to an alternative embodiment, the conveyor belt runs in a plane, which is inclined to the horizontal plane, whereby the carriers can then be rotated relative to the conveyor belt, in order to maintain the alignment of the containers independently of the position along the course of the conveyor belt, so that it is ensured that printing compound cannot escape from one of the containers. Each container preferably has a closing element or a cover, which closes a filling and/or removal opening for the printing compound. Each container of the system optionally has an actuatable valve, which allows for an automatic connection of the container to a print head.

It is preferably furthermore provided that each carrier has a V- or U-shaped receptacle, which is open on the edge side. The containers can thus be introduced laterally or on the edge side, respectively, into the respective carrier, and do not have to be inserted completely, for example, into the carrier from the top. A simple inputting and removal of containers is thus ensured at the carriers of the storage magazine.

The storage means preferably has several containers, which are likewise formed identically, so that each container securely cooperates with each carrier. The respective container preferably has a guide section, which can be inserted into the receptacle, and a holding section, wherein the holding section has at least one holding protrusion, which protrudes laterally beyond the guide section, for placement on the carrier. With the guide section, the container can thus be inserted with the edge side laterally or based on a central axis of the container, radially, respectively, into the receptacle of the respective carrier, in order to subsequently deposit or place, respectively, the container with the holding section onto the carrier. For this purpose, the holding protrusion has a width, which is larger than the inside diameter of the receptacle of the carrier, so that the container can be arranged securely on the carrier.

The holding protrusion is particularly preferably formed as collar extending over the circumference of the container. It is thus ensured that, independently of a rotational position of the container about its longitudinal central axis, the container can always be fastened securely to the carrier because the collar can be deposited onto the carrier on the edge of the receptacle, independently of the rotary position.

The container particularly preferably has a circular cross-section, so that it is formed in the shape of a circular cylinder or of a test tube and can be mounted securely to the carrier at any time. The containers are in particular formed as printer cartridges, which can be inserted into a print head or a printing device.

It is furthermore preferably provided that in the housing at least one sensor for detecting at least one state value of a printing compound in one of the containers is arranged. The sensor thus serves the purpose, for example, of determining the fill level of the printing compound in a container arranged on a carrier. It is preferably furthermore provided that at least one sensor is formed to determine a quality of the printing compound, for example with respect to a color particle density or a moisture value or an aging state.

For this purpose, the sensor is in particular formed as light sensor or fill level sensor. The sensor is thereby in particular arranged and firmly positioned in the housing, so that the containers comprising the printing compounds can be conveyed past the sensor by driving the conveyor belt, so that a sensor process is always performed in the same place in the housing.

Particularly preferably, each container has an identification means, and the storage magazine has at least one reader for detecting an identification of the respective container provided by the identification means. The identification means is formed, for example, as optically detectable identification feature, such as, for example, as barcode, DMC code (data-matrix code), or QR code (quick response code). The identification means is preferably formed as RFID chip (RFID—radio frequency identification), so that a contactless detection, which forgoes optical means, of the identification of the respective container is possible. With the use of an RFID chip, it is moreover possible that the storage means itself stores data in the identification means of the respective container, such as, for example, data relating to the current fill level or the quality of the printing compound located in the container. The storage time and the storage state as well as the storage history can also be stored. With the help of the identification means and the reader, it is thus possible to always systematically remove a desired container from the storage magazine or to convey a desired container to a removal point by means of the conveyor belt, respectively. Additionally or alternatively, the carriers optionally each have an identification means, in order to be able to store an assignment of the containers to the carriers.

According to a preferred further development of the invention, at least one holding-down device having a run-on slope for the containers is arranged in the housing above the conveyor belt. It is attained by means of the holding-down device, for example, that containers, which are not inserted correctly, are shifted in the carriers by means of the holding-down devices into a position, which is lowered or deposited onto the carrier, respectively, when they are conveyed by means of the conveyor belt along the holding-down device. It is thus ensured that the containers are always held securely and in a desired position on the respective carrier. The holding-down device optionally assigns a closing element to the containers when moving past, and is inserted into an opening of the container, in order to close the container in an automated manner on its top side, or an available closing or cover element is pressed into the container again. On their one front end, the containers preferably have an opening, through which the containers can be filled with the desired printing compound in a separate device. The opening is preferably closed tightly by means of a closing element. After the insertion of the respective container into the storage magazine, the holding-down devices ensure that the closing element, in the event that it detached or partially detached from the container, is pushed back into the closed position again. This is advantageous, for example, when the closing element is pushed out of the container due to pressure developing in the container during its use in a printing means.

According to a preferred further development of the invention, a transport means, in particular dispenser of a printing device, which is formed to extract a container from a carrier of the storage magazine and to deliver it to the printing device, and to extract a container from a printing device and to arrange it on a carrier of the storage magazine, is moreover assigned to the storage magazine. The removal of containers from the storage magazine as well as the delivery of containers into the storage magazine is thus accomplished in an automated manner by means of the transport means.

The transport means is, for example, a controllable robotic arm or the dispenser of the printing device itself.

The printing system according to the invention comprising the features of claim 15 is characterized by the formation of the storage means according to the invention. This results in the advantages, which have already been mentioned. The printing system in particular also has the above-mentioned transport means, by means of which a container can be transported from the storage magazine to the print head or from the print head to the storage magazine. A fully automatic printing compound exchange is thus ensured at the print head, whereby the storage magazine can provide a selection of different printing compounds in a small space by means of the several containers.

The dispenser particularly preferably forms a transport means, by means of which a container can be extracted from the storage system or can be delivered to the storage system. The transport of the containers from the storage system to the printing device can thus be accomplished by means of the dispenser itself. For this purpose, the dispenser particularly preferably has at least one gripping means, by means of which the dispenser, which can be moved independently of the print head of the printing device, can grip and extract a container from the storage magazine. A fluidic connection of the dispenser to the container and the printing compound located therein is moreover in particular established by means of the gripping means, when the container is extracted from the storage system, and is interrupted when the container is delivered to the storage system by means of the dispenser.

BRIEF DESCRIPTION OF THE DRAWINGS

Further advantages and preferred features and feature combinations follow in particular from what has been described above. The invention will be described in more detail below on the basis of the drawing, in which.

DESCRIPTION OF EXAMPLE EMBODIMENTS

Figure 1:
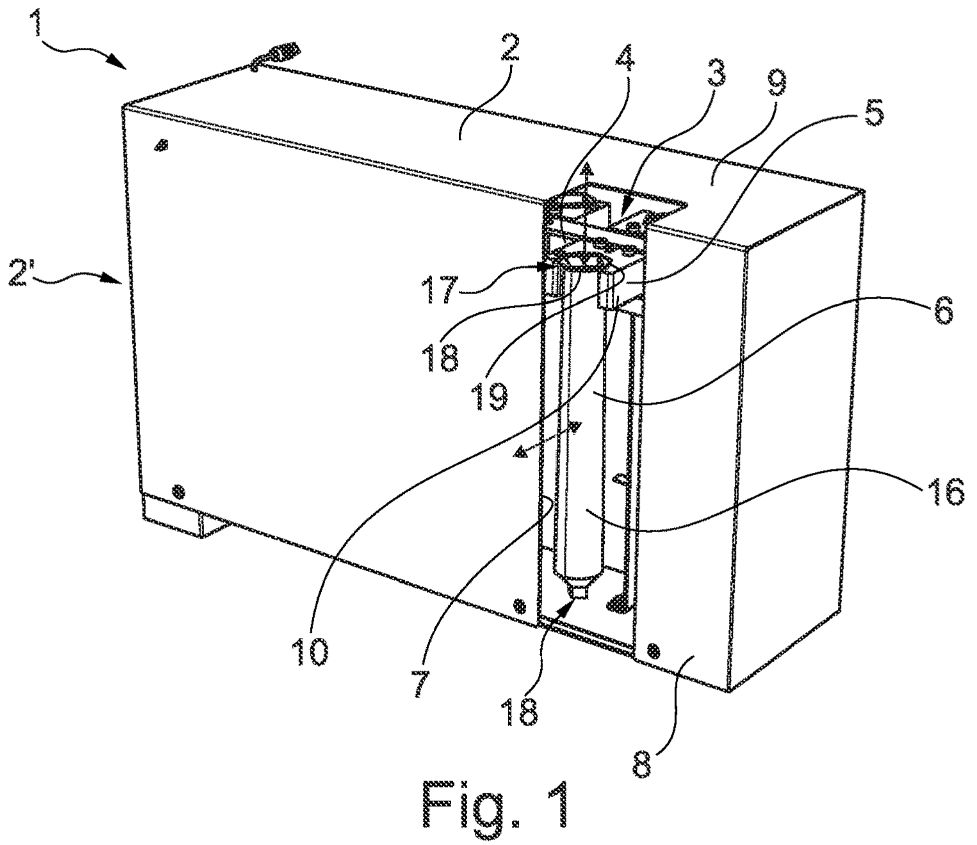
FIG. 1 shows an advantageous storage means for a printing system in a perspective illustration.

In a perspective illustration, FIG. 1 shows an advantageous storage means 1 for a printing system, which is not illustrated in more detail here. The storage means 1 has a housing 2, in which a storage magazine 3 is arranged, which is formed as ring magazine. For this purpose, the storage magazine 3 has a conveyor belt 4, which is arranged in the housing 2 so as to circulate in a horizontal plane and has several carriers 5 for receiving a respective container 6. An opening 7, through which the storage magazine 3 can be reached, in particular in order to preferably automatically extract containers 6 or in order to delivery containers 6 to the storage magazine 3, is formed in the housing 2. In particular a transport means, which will be described in more detail below, is present for the removal and the delivery. The opening 7 is only slightly wider than one of the carriers 5 and larger than one of the containers 6, so that a container 6 can be removed or can be extracted or delivered, respectively, through the opening 7. The opening 7 thereby extends in a side wall 8 and, according to the present exemplary embodiment, also in a ceiling wall 9, so that the container 6 arranged on the carrier 5 can be reached from the top through the opening 7 in the ceiling wall 9 as well as through the side wall 8 when a carrier 5 is located in the region of the opening 7. In particular on a front side 2', which lies in particular on the end of the housing 2 facing away from the opening 7, the housing 2 optionally has a further, in particular wider opening, which is formed for the manual or fully autonomous feeding of the containers 6, thus provides for a manual or fully autonomous feeding of the containers in the storage magazine 3.

Figure 2:
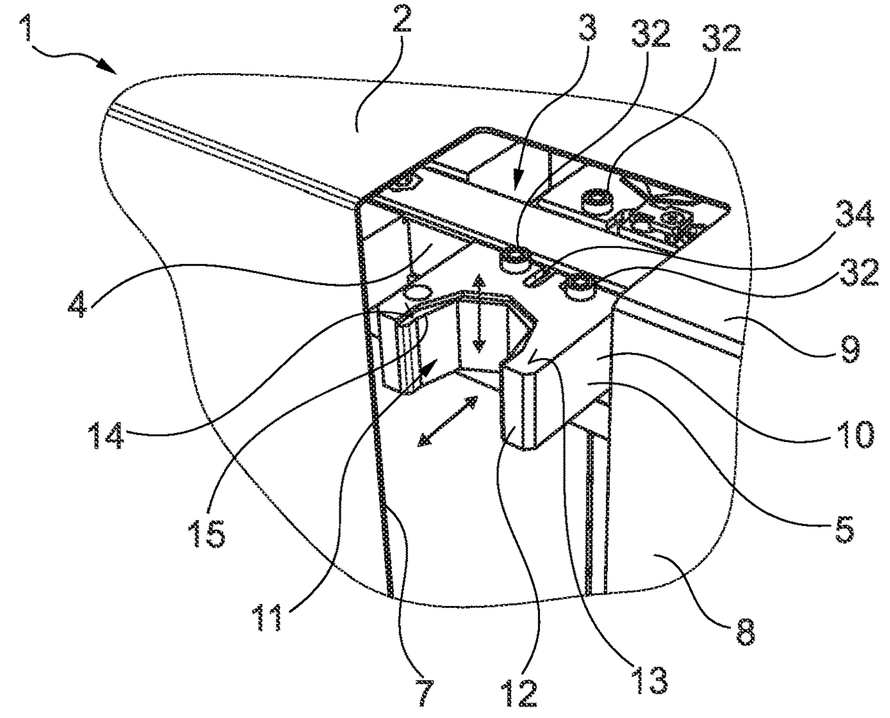
FIG. 2 shows an enlarged detailed view of the storage means from FIG. 1.

FIG. 2 shows an enlarged perspective illustration of the storage means 1 in the region of the opening 7. All of the carriers 5 are formed identically, so that by means of the carrier shown in FIG. 2, the setup of thereof is to be described in detail. Each carrier 5 has a carrier element 10, which is firmly connected to the conveyor belt 4 and which is formed in a fork-shaped manner, so that it has a V- or U-shaped receptacle 11. The receptacle 11 is thereby formed to be open on the edge side, namely on the outer side 12 of the carrier element 10, which faces away from the conveyor belt 4. Starting at the outer side 12, the inside diameter of the receptacle 11 tapers, so that there are preferably no undercuts in the receptacle in the lateral insertion direction. A depression 14, which extends all the way to the receptacle 11, is formed on a top side 13 of the carrier element 10 in the region of the receptacle 11. The depression 14 completely surrounds the receptacle 11 and has an outer contour, which substantially corresponds to the contour of the depression 14. A support 15, in which the respective container 6 is held in a positive manner, as shown in FIG. 1, is thus created in the carrier element 10.

The containers 6 are in each case formed as cartridge and have a cylindrical base body 16, which is formed to be open on one front end 17 and which is closed on the front end 18 facing away from the one front end 17. On the front end 17, the container 6 furthermore has a laterally protruding holding protrusion 18 in the form of a collar 19 extending over the entire circumference of the container 6. According to the present exemplary embodiment, the cross-section of the container 6 is circular, so that the collar 19 also has a circular cross-section or a circular outer contour, respectively. The depression 14 in the carrier 10 has an outer contour corresponding thereto, which has a slightly larger diameter than the collar 19. The respective collar 6 can thus be inserted laterally or from the top with the collar 19 into the receptacle 11 and can be deposited with the collar 19 on the support 15 in the depression 14, so that the container is held securely in the carrier 5. By means of the transport means, which has already been mentioned, the container 6 can in particular be gripped from the top through the opening 7 in the region of the ceiling wall 9 and/or from the bottom or laterally, respectively, through the opening in the region of the side wall 8, can be lifted slightly, and can then be guided laterally through the opening 7 in the side wall 8 out of the housing 2, or the other way around, as suggested by means of double arrows in FIG. 1.

The conveyor belt 4 is thereby arranged in the upper region of the housing 2, so that larger containers 6, as shown in FIG. 1, can also be received by the carriers 5, without hitting the bottom of the housing 2. Different containers 6, in particular containers with different length of height, can generally be placed into the carrier. However, the containers 6 of the storage means 1 or of the printing system are preferably formed identically.

Figure 3:
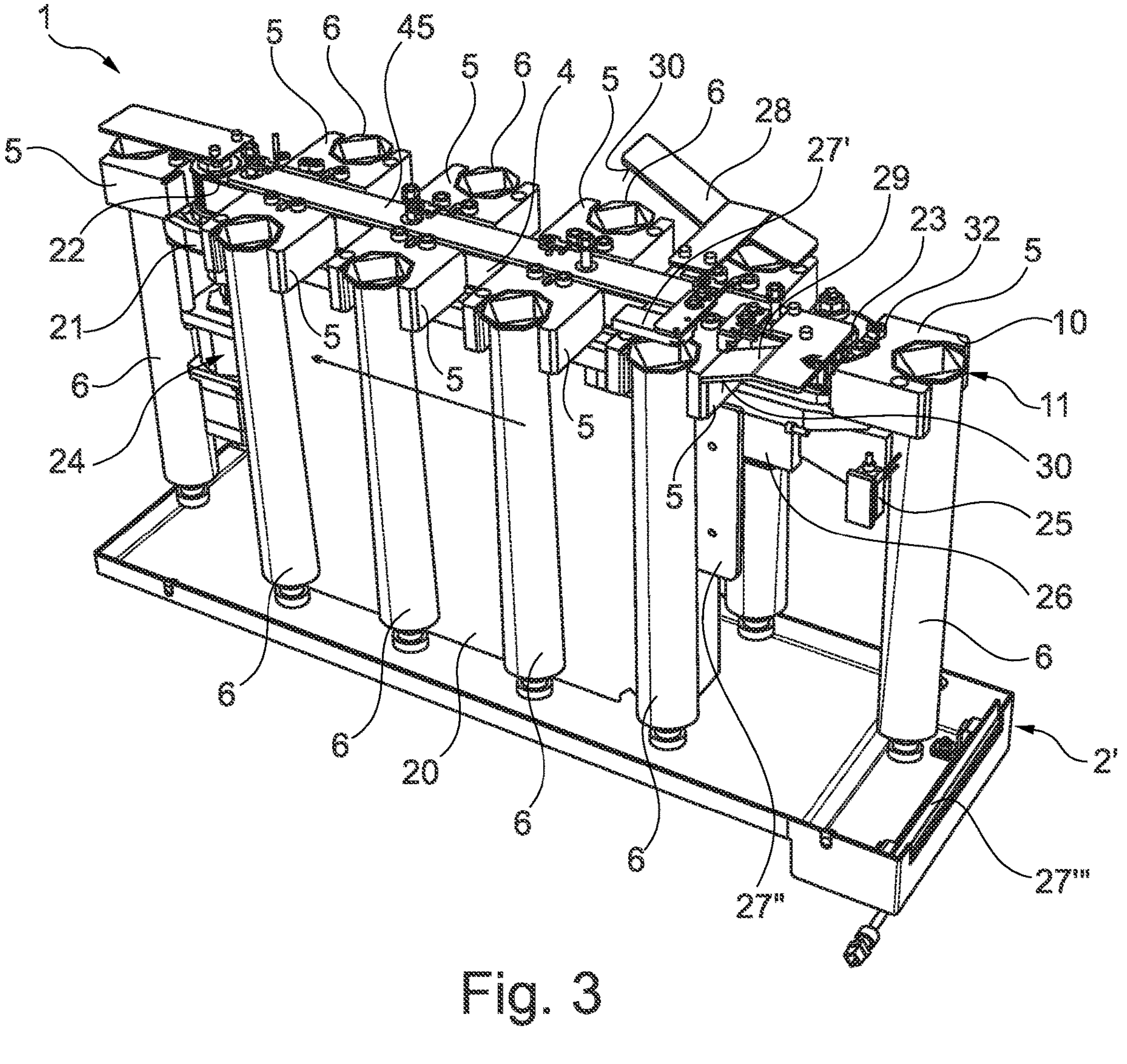
FIG. 3 shows a further perspective illustration of the storage means without housing.

FIG. 3 shows the storage means 1 in a further perspective illustration without the housing 2. A carrying structure 20, which carries a guide plate 21 spaced apart from the housing bottom, is arranged on the housing bottom. In the case of installation as intended, the guide plate 21 extends horizontally and has a narrow width and a comparatively large length, so that it is formed to longitudinally extend horizontally. Deflection rollers 22, 23 are arranged on both ends of the guide plate 21—viewed in the longitudinal extension—around which the conveyor belt 4 is guided parallel to the guide plate 21 and is in particular tensioned. The axes of rotation of the deflection rollers 22, 23 are aligned vertically. The conveyor belt 4 is in particular formed as toothed belt and at least the deflection roller 22 has an outer toothing corresponding to the teeth of the toothed belt, in order to ensure a secure torque transmission to the toothed belt.

By means of a shaft guided through the guide plate 21, the deflection roller 22 is connected in a rotationally fixed manner to a drive motor 24, which is arranged below the guide plate 21 and thus between the housing bottom and the guide plate 21. The drive motor 24 is formed in particular as electric motor. By means of electrically controlling the drive motor 24, the conveyor belt 4 can thus be set into motion, so that it runs in a ring-shaped manner around the deflection rollers 22, 23.

A guide element 45, which ensures that the toothed belt follows a provided track in the region between the deflection rollers 23, preferably lies between the deflection rollers 22, 23. The element serves in particular as spacer between the conveyor belt sections of the conveyor belt 4, which run in opposite directions, during operation.

As shown in FIG. 3, several, in the present case ten carriers 5, are arranged on the conveyor belt 4. Due to the fact that the conveyor belt 4 runs in a ring-shaped manner in a horizontal plane, all of the carriers 5 are arranged on the outer side of the conveyor belt 4 and in particular evenly spaced apart from one another—viewed in the direction of extension of the conveyor belt 4. While there are ten carriers 5 according to the present exemplary embodiment, the storage means 1 can obviously also have more or fewer carriers 5.

FIG. 3 thereby shows the storage means 1 on the side of the housing 2 facing away from the opening 7. In particular on the front side of the conveyor belt 4 facing away from the drive motor 24, several sensor means 25 to 27''' are optionally arranged, which serve the purpose, for example, to determine a fill level of printing compound in the respective container 6 or a quality of the printing compound. According to the present exemplary embodiment, the sensor 25 is formed for the container or cartridge detection, respectively, in particular for detecting the presence of a cartridge and/or of its fill level. The sensor 26 is in particular formed as barcode reader, which serves the purpose of reading a barcode applied to the respective cartridge or the respective container 6, respectively. The sensor 27' is preferably formed as reader and/or writer for RFID chips or tags. The sensor 27' is thereby assigned to the top side of the carriers 10, in order to read or to write RFID chips arranged on the carriers 10. A further sensor means 27'' is alternatively or additionally provided and is likewise formed as reading and/or writing means for RFID chips, which are then arranged or can be arranged on the respective container 6 in this case. A further sensor 27''', which serves as safety switch in the region of the opening of the housing 2 formed in the front side 2', is optionally arranged on the front side 2' in particular in the region of the bottom. For this purpose, the sensor 27''' is formed in particular to create a light curtain, which extends over the openings of the front side 2' and ensures a secure operator intervention for the loading or extraction of containers 6, and thus for feeding the storage magazine 3. If the sensor 27''' detects, for example, that a user reaches into the housing 2 through the opening in the front side 2', a conveying of the containers 6 by means of the conveyor belt 4 is then interrupted. The sensor 27''' thus acts for the safety wiring of the storage magazine 3.

FIG. 3 furthermore shows that several holding-down devices 28, 29 are arranged in the housing 2. In normal running direction of the conveyor belt, as indicated by means of arrows in FIG. 3, the holding-down devices 28 have run-on slopes 30, which have a distance, which decreases towards the containers 6 in the direction of movement of the containers. The holding-down devices 28 serve the purpose, for example, of pushing a closing element for the respective container 6 into the respective container 6, or in order to shift the respective container 6 with the collar 19 all the way to the abutment onto the receptacle 15, in order to ensure a secure hold on the respective holder 5.

Figure 4A:
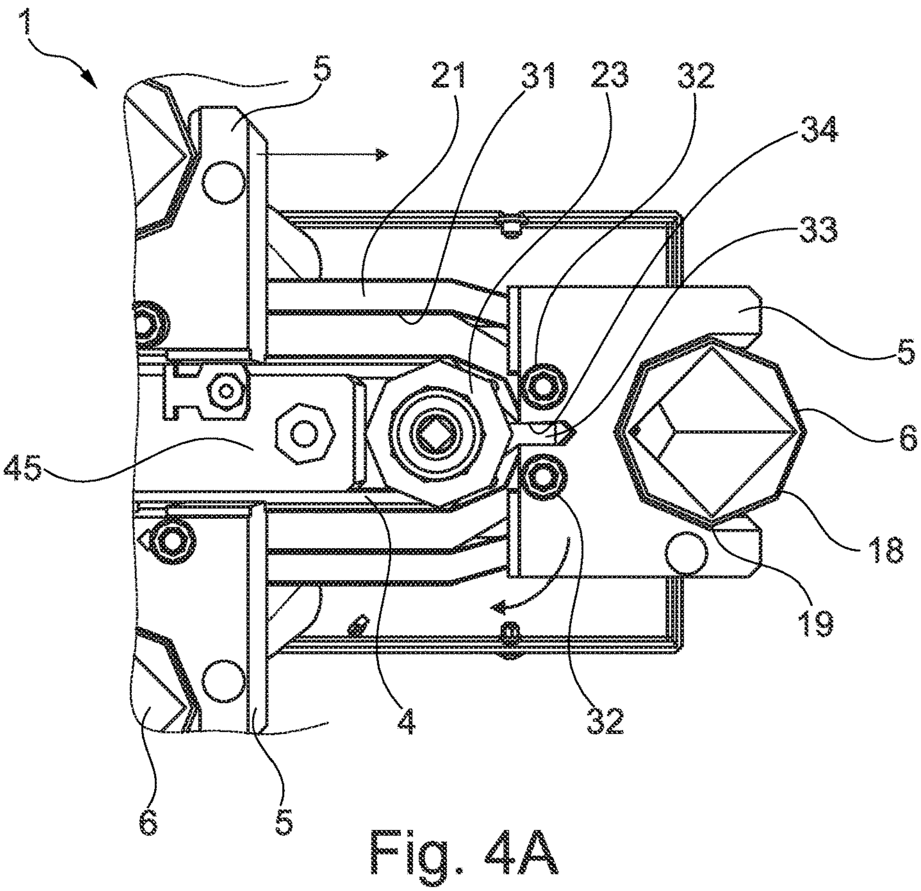
FIGS. 4A and 4B show further detailed views of the storage means.
Figure 4B:
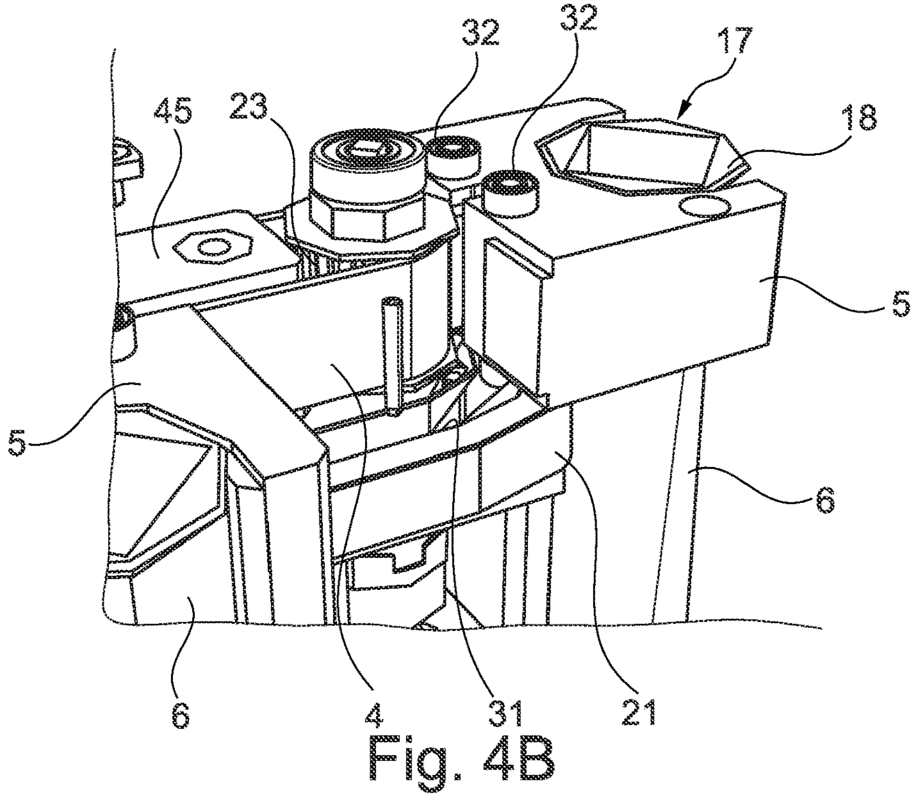

In enlarged detailed views, FIGS. 4A and 4B show the guidance of the carriers 5 in the storage means 1. For this purpose, FIG. 4A shows a top view onto one of the carriers 5, which is located on a front end of the conveyor belt 4, and FIG. 4B a perspective illustration of the same carrier 5.

The guide plate 21 has a guide groove 31 extending over the entire circumference. On its underside assigned to the guide plate 21, each carrier 5 has two guide rollers 32 or bolts lying in the guide groove 31. The guide rollers 32 have an outer diameter, which is slightly smaller than the inside diameter of the guide groove 31, so that the carrier 5 or the carrier element 10, respectively, is guided along the guide groove 31 on the guide plate 21 by means of the guide rollers 32.

In can be seen in particular in the top view of FIG. 4A that the conveyor belt has a laterally protruding follower 33, which lies in a lateral recess 34 of the carrier element 10. The follower 33 is in particular pressed into the recess 34, so that it is connected to the carrier 5 without play. On the side facing away from the carrier 5, the follower 33 is firmly connected to the conveyor belt 4, particularly preferably formed in one piece with the latter. When the conveyor belt 4 is now driven, then the follower 33 pushes the carrier 5 along the guide groove 31 of the guide plate 21 by means of the guide rollers 32.

On the top side 13 facing away from the guide plate 21, each carrier 5 has two further guide rollers 32, which are arranged axially parallel to the guide rollers 32 on the underside of the carrier 5. These guide rollers 32 serve the purpose of running in a guide groove, which corresponds to the guide groove 31, of a further guide plate 35, which is arranged so as to be located opposite the guide plate 21 and thus covers the belt drive from the top.

Figure 5:
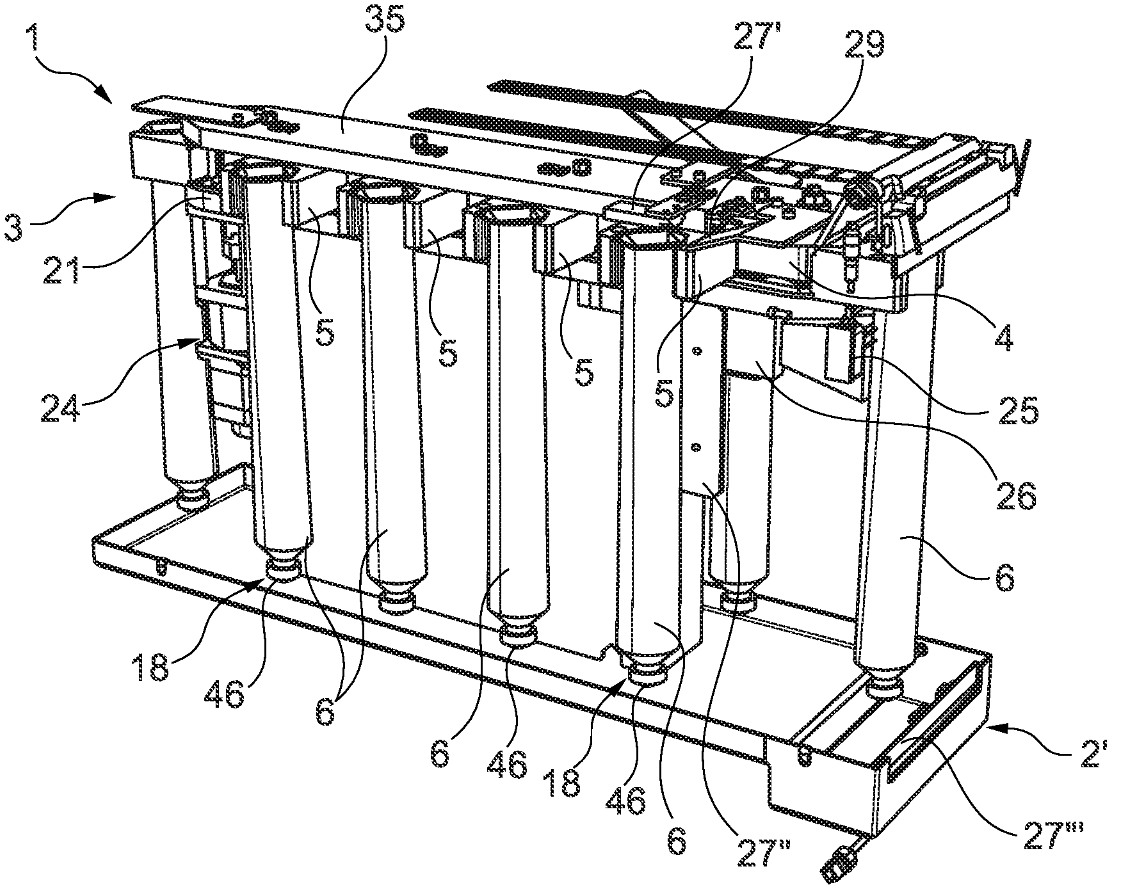
FIG. 5 shows an advantageous further development of the storage means in a perspective illustration.

For this purpose, FIG. 5 shows, in a further perspective illustration, the storage means comprising guide plate 35, which is now drawn in, located opposite the guide plate 21, so that the carriers 5 run between the guide plates 21, 35 and in each case lie with their guide rollers 32 in one of the guide grooves 31. A secure and precise guidance of the carriers by means of the conveyor belt 4 is ensured therewith.

By controlling the drive motor 24, the containers 6 can thus be displaced in such a way that they are delivered to the opening 7, if required, in order to be capable of being removed from there. The containers and/or the carriers advantageously each have an identification means 36, which is formed, for example, as optically readable QR code or barcode, or as RFID chip, as already described above. The data can be detected and the respective container and/or carrier can thus be identified and can be stored, for example, in a memory of a controller of the storage means, by means of a corresponding sensor system, in particular by means of the sensor 27, which is formed as reader for the identification means 36 in the present case. If required, the stored and selected container can then be delivered systematically to the opening. Due to the fact that the RFID chips each represent a non-volatile memory, a reliability against interference is ensured. This is significant for the storage, when the storage means 1 or the corresponding printing device are turned off at night, on the weekend and/or for a long time, and the containers 6 remain in the storage means 1 or in the printing device.

Figure 6:
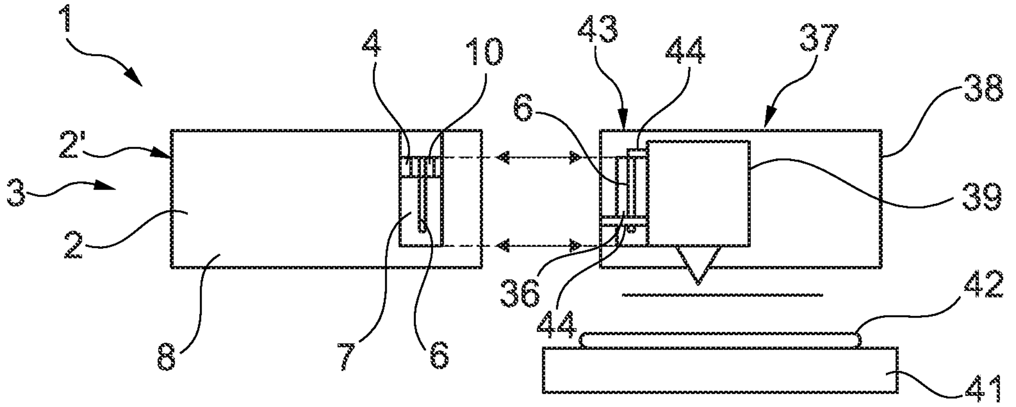
FIG. 6 shows an advantageous printing system comprising the storage means in a simplified illustration.

In a schematic illustration, FIG. 6 shows the integration of the storage means 1 into an advantageous printing system.

The printing system has a printing device 37 comprising a print head 38 and comprising a controllable dispenser 39. The dispenser 39 can in particular be controlled and moved independently of the print head 38. The dispenser 39 has a cartridge receptacle 40, into which one of the containers 6 comprising a desired printing compound can be inserted. The printing device 37 furthermore has a printing table 41, onto which a substrate 42 to be printed can be placed for the printing process. The substrate 42 is, for example, a circuit board, a wafer, or a solar cell, or the like. The printing compound from the container 6 is applied to a printing stencil, which is only suggested here, by means of the dispenser 39, and is subsequently applied to the substrate 42 to be printed by means of the print head 38, in particular by means of a doctor blade of the print head 38, through the printing stencil.

The storage means 1 is arranged next to the printing table or the print head. A transport means 43, which, according to an exemplary embodiment, has a controllable robotic arm, is assigned to the storage means 1. The robotic arm is formed to extract a container 6 from the opening 7 of the housing 2 of the storage means 1 and to insert it into the cartridge receptacle 40 of the dispenser 39, or to deliver it from the dispenser 39 to the storage magazine 3.

According to the present exemplary embodiment, the transport means 43 is formed by the dispenser 39. For this purpose, the dispenser 39 has, for example, a gripping means 44, which is formed to extract a container 6 from the storage magazine 3 or to deliver it to the latter.

The cartridge receptacle 40 and the containers 6 are in particular formed in such a way that a connection to the printing compound is automatically opened or released in the container 6 during the insertion in the cartridge receptacle 40. For this purpose, the containers 6 have, for example on their end 18 facing away from the collar 19, a valve 45, which cooperates with a corresponding actuating means in the cartridge receptacle 40 to release the printing compound.

Together with the transport means 43 and the printing table 37, the storage means 1 forms the printing system, which makes it possible to perform a printing compound change in a fully automated manner and to thus attain long processing times during the creation of certain products, which are to be printed with different printing compounds. The printing compounds can be, for example, electroconductive printing compounds for creating conductor tracks, but also colors or other compounds or pastes.

The storage magazine 3 can be loaded or unloaded (fed) manually by an operator or in an automated manner by an automat or robot (both not illustrated) through the openings of the front side 2' of the storage magazine 3. The opening 7 is thus reserved for access to the dispenser 39 or the transport means 43, respectively. An uncoupling of the printing device 37 from the feeding of the storage magazine 3 is thus ensured.

The invention claimed is:

1. A storage system for storing and providing printing compound for a printing device for printing on planar substrates, comprising at least one container, which is formed for storing a liquid printing compound, and comprising at least one carrier, on which the at least one container can be detachably arranged, wherein the storage system has a storage magazine comprising several carriers and comprising several containers, wherein the carriers are fastened to a circulating conveyor belt, wherein at least one controllable drive motor for driving the conveyor belt is assigned to the conveyor belt, wherein that the conveyor belt comprising the carriers is arranged in a housing, and that the housing has at least one opening at a transfer point, through which the at least one container can be fastened to one of the carriers or can be removed from one of the carriers, that a closing element is assigned to the opening, by means of which the opening can be closed completely, and that, apart from that, the housing is formed to be closed.

2. The storage system according to claim 1, characterized in that all of the carriers are formed identically.

3. The storage system according to claim 1, wherein that the conveyor belt is formed so as to circulate in a horizontal plane.

4. The storage system according to claim 1, wherein each carrier has a V- or U-shaped receptacle, which is open on the edge side.

5. The storage system according to claim 1, wherein the respective container has a guide section, which can be inserted into a receptacle, and a holding section, wherein the holding section has at least one holding protrusion, which protrudes laterally beyond the guide section, for placement on the carrier.

6. The storage system according to claim 1, wherein the holding protrusion is formed as collar extending completely over the circumference of the at least one container.

7. The storage system according to claim 1, wherein the at least one container has a circular cross-section.

8. The storage system according to claim 1, wherein all of the containers are formed identically.

9. The storage system according to claim 1, wherein in the housing at least one sensor for detecting at least one state value of a printing compound in one of the containers is arranged.

10. The storage system according to claim 1, wherein the sensor is formed as a light sensor, fill level sensor, or matrix scanner.

11. The storage system according to claim 1, wherein each container has an identification means, and that at least one reader for detecting an identification feature provided by the identification means is assigned to the conveyor belt.

12. The storage system according to claim 1, wherein at least one holding-down device having a run-on slope is arranged above the conveyor belt and is assigned to the carriers.

13. The storage system according to claim 1, wherein a transport means comprising a dispenser of the print device, which is formed to extract the at least one container from the carrier of the storage magazine and to deliver the at least one container to the printing device, and to extract the at least one container from the printing device and to arrange the at least one container on the carrier of the storage magazine, is assigned to the storage magazine.

14. A printing system for printing on the planar substrates, comprising at least one print head, comprising a dispenser, for applying the printing compound to the substrates, wherein the dispenser can be connected or is connected to the container providing the printing compound, and comprising the storage system, which has at least one container, which is formed for storing a liquid printing compound, and at least one carrier, on which the container can be detachably arranged, wherein the storage system is formed according to claim 1.

15. The printing system according to claim 14, wherein the dispenser forms a transport means, by means of which the container can be extracted from the storage system or can be delivered to the storage system.

* * * * *